May 5, 1959     C. O. BLISS     2,885,087
DISH DRAINER
Filed Oct. 30, 1953
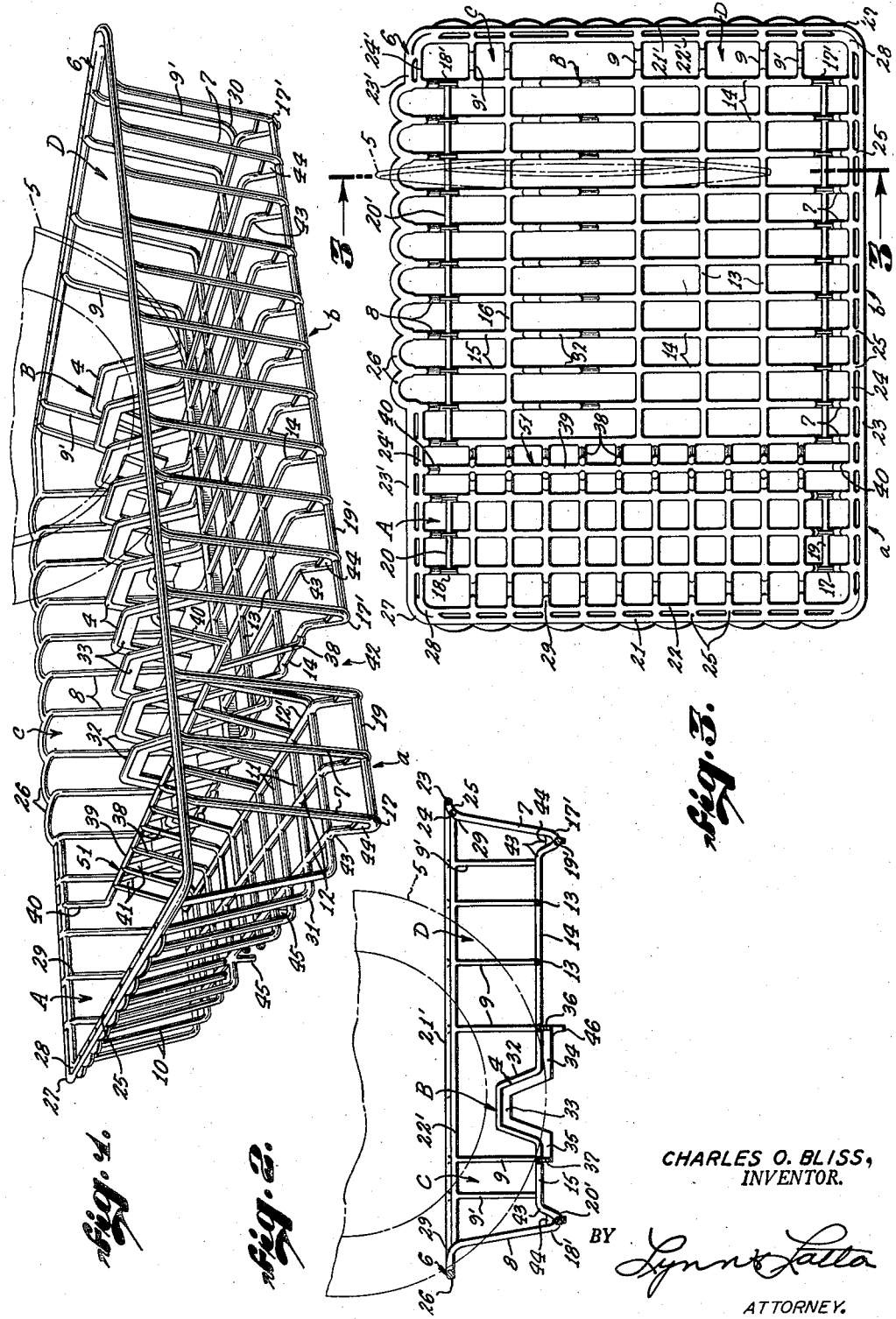
CHARLES O. BLISS,
INVENTOR.
BY
ATTORNEY.

United States Patent Office 2,885,087
Patented May 5, 1959

2,885,087

DISH DRAINER

Charles O. Bliss, Los Angeles, Calif.

Application October 30, 1953, Serial No. 389,219

3 Claims. (Cl. 211—41)

This invention relates to dish drainer baskets (commonly referred to as "drainers") and has as its general object to provide a drainer of inexpensive construction.

Hitherto, dish drainers have been fabricated from wire parts, formed and soldered or welded together, and then coated. Originally, they were coated with enamel. Subsequently, wire baskets coated with a tough, soft resilient material such as latex or a synthetic resin plastic material of comparable resiliency, for maximum protection of the dishes and silverware against marring, have been made available. All such drainer baskets have, however, been relatively expensive in construction because of the fabrication costs involved in forming, assembling and finishing the wire parts.

Specifically, the present invention aims to provide a drainer of molded synthetic resin plastic material. The concept of forming various kitchen and tableware articles of molded plastic material is of course a very common one, but no one has hitherto successfully applied the molded plastic technique to the fabrication of a drainer, due to the obviously difficult problems involved in successfully molding an article of such relatively large overall proportions and relatively small diameter of the individual members thereof. In this connection, the invention proposes to provide a molded drainer having individual members just as small in diameter as the coated wire members of the conventional drainer.

A further object of the invention is to provide such a drainer, of a construction such that a series of the drainers may be stacked in nested array within a minimum space.

Another object is to provide such a drainer, having a dish rack comprising a plurality of upstanding dish props which are so proportioned as to be separated by spaces of maximum width in proportion to the thickness of the props, yet are of ample strength to resist the prying effect of dishes propped between them.

A further object is to provide such a drainer basket, of sufficient stiffness to be form-retaining (e.g. to retain a pre-designed rectangular and planar marginal contour) under ordinary handling, yet sufficiently flexible to conform to irregularities in a supporting surface (e.g. in departing from a flat plane) so as to avoid being cracked or broken when supporting a heavy load of dishes.

A further object is to provide a drainer of extremely light weight construction.

Other objects will become apparent in the ensuing specification and appended drawings in which:

Fig. 1 is a perspective view of a dish drainer basket embodying the invention;

Fig. 2 is a transverse sectional view thereof; and

Fig. 3 is a plan view thereof.

Referring now to the drawings in detail, my improved drainer comprises a plurality of integrally joined parts of molded synthetic resin plastic material (e.g. polystyrene) of medium hardness, maximum rigidity when supporting its own weight or nested with other like drainers in a stack on a merchant's shelf or in a shipping carton, yet sufficiently flexible to yield moderately to distorting forces in a manner to avoid being fractured. This combination of toughness and moderate flexibility is important in view of the probability of the drainer being placed upon a support which is not flat, or having some small article as an obstruction under one or more of the legs thereof. As the drainer becomes loaded with the weight of a full load of dishes (which becomes considerable where the dishes are ceramic) the ability to flex moderately in order to adjust all of its legs and supporting members into full load carrying contact with the supporting surface or surfaces, is quite important in avoiding breakage of the basket. The flexibility is also important in the handling of the drainers during shipping and selling, and in the kitchen.

In general, the drainer is constructed to embody two main sections $a$ and $b$, providing the conventional transverse compartment A extending along one end thereof, for holding silverware, with the remainder of the basket being provided by a series of dish rack props B into a narrow longitudinal compartment C' on one side of the row of props B and a relatively wide longitudinal compartment D on the other side thereof. Normally, the compartment C, the spaces between the row of props B, and a majority of the width of compartment D will be utilized to accommodate a series of dinner plates or smaller dishes (indicated in broken lines at 5) propped between the props B; and the remainder of the space at the outer side of compartment D may be utilized for teacups, tumblers and other articles of comparable proportions.

Structurally, the drainer basket includes a rim, indicated generally at 6; a plurality of upright bars 7, 8, 9, 9' and 10 constituting the end and side members of the basket; a series of crossed bars 11, 12 and 12', integrally joined in a common plane to define the bottom of silverware compartment A; a series of crossed bars 13 and 14, integrally joined in a common plane to define an open work grid bottom for compartment D, a series of parallel transverse bars 15 and a longitudinal bar 16 crossing the same and integrally joined thereto in a common plane to define a bottom for compartment C; a series of foot yokes 17, 17', 18, 18' which join the side uprights 7 and 8 to the transverse bottom bars 12, 12', 14 and 15, respectively; longitudinal tie bars 19 and 19' bridging between the foot yokes 17 and 17', respectively; longitudinal tie bars 20 and 20' bridging between the foot yokes 18 and 18', respectively; and a transverse bridge, indicated generally at 51, which functions as a partition between the compartment A and the compartments C, D.

In solving the problem of combining maximum weight lightness and slenderness of the structural parts with maximum toughness, durability and flexibility and form retaining characteristics, I have utilized a reinforced lattice structure in the rim 6 which provides maximum rigidity of rectangular peripheral outline combined with yieldability to strains tending to twist the rim from a flat plane to a warped condition. This is attained by utilizing, in the structure of rim 6, parallel, closely spaced outer and inner bars 21, 22 and 21', 22' for the respective end portions of the rims; parallel, closely spaced outer and inner longitudinal bars 23, 24 for one side portion of the rim, and parallel, closely spaced outer and inner longitudinal bars 23', 24' for the other side portion of the rim, these bars being joined by short webs 25 which are aligned with the respective upright members 7, 8, 9 and 10. The lattice structure thus provided is relatively flexible in yielding to twisting strains, yet quite resistant to forces tending to bend or bow the rim members inwardly or outwardly from the rectangular peripheral outline of the rim.

The rim members 23', 23' are interrupted, being connected by a series of horizontal arches 26. The corners of the rim are composed of arcuate members 27 of full round cross section constituting continuations of outer bars 21, 21', 23, 23', respectively, together with arcuate webs 28, integral with and somewhat thinner than members 27, joining the respective bars 22, 22', 24, 24' to the members 27, and thus providing relatively rigid corners for resisting angular displacement of the respective rim members from rectangular relation.

The webs 25 constitute continuations of arcuate bends 29 with which the upper ends of upright members 7—10 are joined to the respective rim members 24, 24', 22', 22, respectively, as shown in Fig. 2. Thus the inner rim bars 22, 22', 24, 24' are disposed at a slightly lower level than the outer bars 21, 21', 23, 23', with their upper surfaces flush with the upper surfaces of corner webs 28. This combines a pleasing appearance with maximum structural advantages.

The lower ends of side uprights 7 and 8 merge with the outer arms of foot yokes 17, 18, 17', 18' as previously indicated. The lower ends of end uprights 9 and 10 are formed as continuations of the outer ends of longitudinal bottom bars 13 and 11, being joined thereto by corner bends 30, 31, respectively. Two end bars 9' at the respective corners of the basket are provided, for corner strength, but are not continued beyond the outer transverse bottom bars 14, 15.

Disk rack props 4 are of arched form, each including an outer member 32 of round bar section corresponding to that of the members 7—10, 11—15 etc., and each including an inner web 33 of greater width and less thickness than the corresponding portions 32 to which the respective web is joined throughout its length. Each web 33 includes, in addition to the arched portion thereof, horizontal foot portions 34, 35 which are joined integrally to the transverse bottom bars 14, 15, respectively, between the adjacent longitudinal bottom bars 13, 16, respectively, to which they extend. The ends of horizontal webs 34, 35 are joined to longitudinal sill webs 36, 37, respectively, which are disposed directly beneath and integrally united with the adjacent, opposed longitudinal bottom bars 13, 16 throughout the length of the latter. The webs 36, 37 reinforce these two longitudinal bars, at the respective sides of dish rack props 4, to resist bending loads of the dishes propped in the racks. In this connection it will be noted that the rims of the plates 5 will rest against the adjacent bars 13, 16.

The integral connection between the ends of horizontal webs 34, 35 and sill webs 36, 37 braces the props 4 against bending moments tending to rotate the props around the axes of transverse bottom bars 14.

The bridge 51 comprises a series of arches 38 of inverted V-form, the apexes of which are integrally joined by a transverse tie bar 39. Arms 40, integrally joined to the respective ends of tie bar 39 extend upwardly to join the inner longitudinal rim bars 24, 24'. Arms 40 are disposed in the common plane of side uprights 7, 8. Arms 40 function, in tension, to resist any downward forces that might be applied to tie bar 39 or arches 38.

At this point it may be noted that the two main sections a and b of the basket are joined by the bridge 51 and the side rim members 23, 23', 24, 24', any bending loads applied to the respective sections a and b tending to bend them about a transverse axis between them (e.g. the axis of tie bar 39) being resisted by the arches 38 and the side members of the rim, one of them acting in compression and the other in tension. For example, any tendency to bend the respective sections a and b upwardly around tie bar 39 would be opposed by resistance of arches 38 to spreading, aided by the bridging rim members, acting in compression as struts, and vice versa; any tendency to bend the respective sections a and b downwardly around the axis of tie bar 39 would be resisted by the bridging rim members acting in tension, and by the resistance of the arches 38 to being compressed.

Arches 38 are stiffened against either spreading or compression by integral gusset webs 41, filling the upper portions of the spaces between the side arms thereof and integrally joined to the upper portions of the side arms and to the tie bar 39.

Longitudinal tie bars 19, 19' on one side and 20 and 20' on the other side of the basket are separated by the spaces between pairs of side upright members 7 and 8 which lie on the respective sides of the bridge 39, in the plane of the base extremities of arches 38. Thus there is provided an unobstructed space 42 between the respective arms of arches 38 and between the immediately adjoining transverse bottom bars 12' and 14, respectively, to which the lower extremities of arches 38 are integrally joined by bends as shown. The space 42 is generally wedge shaped, and accommodates the bridge 51 of an immediately underlying drainer in a stack of drainers, so as to accommodate the fairly snug nesting of the drainers, the extent of nesting being limited by the engagement of the apex of the bridge 51 of one drainer against the lower edges of gusset webs 41 of an immediately superimposed drainer. These upright members are disposed at an inclination to the vertical, of sufficient angle to enable nested baskets to be readily separated without undue adherence, and to conform to the general practice of providing upwardly flared sides in baskets of various kinds.

In the nesting operation, the relatively thin webs 33 of dish rack props 4 are allowed to overlap the rib portions 32 of the props 4, the succeeding drainers being started very slightly in a longitudinal direction in order to allow such overlapping.

Foot yokes 17, 17' are joined to the respective ends of transverse bars 12, 12', 14, 15 by bends 43 and are aligned continuations of side uprights 7 and 8. They are stiffened by integral gusset webs 44, which project to substantially the same extent as webs 41, whereby in the nesting of drainers, the longitudinal tie bars 19, 19', 20, 20' of an upper drainer will rest upon the upper edges of gusset webs 44 of an immediately lower drainer.

In the nested drainers, the support between drainers is confined almost entirely to the engagement of the lower edges of gusset webs 41 and the upper edges of gusset webs 44 with the ridge of bridge 51 and with the bottom tie rods 19, 19', 20, 20' of adjoining baskets, respectively. Wedging engagement between registering upright bars 7—10 or arches 38 of adjoining drainers is avoided and consequently there is no tendency for the drainers to adhere one to another.

Section a is adapted to rest upon a supporting surface through the three foot yokes 17, 18 at the respective sides thereof, and through a pair of legs 45 which are formed integrally with and extend downwardly from the crossing junction of the outermost transverse bottom bar 12 and two of the longitudinal bars 11 which are equally spaced on the respective sides of the central longitudinal axis of the drainer. In addition, a pair of legs 46 are disposed at the central longitudinal axis of the drainer to provide support for the medial area of the drainer.

I claim:

1. A one piece dish drainer basket of synthetic organic resin plastic material throughout, form retaining when unloaded, having a moderate overall flexibility when loaded, sufficient to derive firm support from a supporting surface, said drainer basket comprising: a generally rectangular rim of rod form; a plurality of upright bars joined to said rim at their upper ends and projecting downwardly to define two ends and two sides; a bottom comprising a plurality of bottom sections each including a plurality of spaced transverse bars and at least one longitudinal bar crossing and joined to the transverse bars, one of said bottom sections extending transversely at one end of the basket; a transversely extending bridge interposed between said one bottom section and the remainder of the bottom, providing a bridging connection therebetween, and dividing the space within the basket into a relatively narrow transverse silver compartment over said one bottom section and a relatively large compartment for dishes and other articles, said bridge being composed of a series of arches of inverted V-form having vertices at their upper extremities and having legs diverging downwardly therefrom and joined at their lower extremities to marginal transverse bottom bars of the respective bottom sections, and including a transverse tie bar joining said vertices and having, at its respective ends, integral arms projecting upwardly therefrom and integrally joined to the basket rim at respective sides thereof, a downwardly opening, unobstructed wedge-shaped transverse space, extending through the sides of the basket, being defined between the legs of said arches below the bridge, whereby a series of the drainer baskets may be nested, with the bridge of the lower basket projecting upwardly into the space beneath the bridge of a superimposed basket; and a plurality of foot yokes each including a bend at its lower extremity, including the lower extremity portion of a respective side bar joined to one side of said bend, and including a relatively short arm joined to the other side of said bend and extending upwardly therefrom in inwardly spaced relation to the respective side bar, and a series of bends joining the upper ends of said yoke arms to the outer ends of respective transverse bottom bars; longitudinal tie bars bridging between and joining said bottom bends of the foot yokes except at the ends of said transverse bridge space; and a plurality of transversely extending dish props of arch form projecting upwardly from the bottom of said main compartment and arranged in a longitudinal row in longitudinally spaced relation, said props each being joined to the end of a transverse bottom bar at one side and joined to the lower end of a respective bottom bar at its other side.

2. A drainer basket as defined in claim 1, wherein said row of dish props is disposed relatively near one side of the basket and relatively distant from the other side and wherein the rim, along said near side of the basket, includes a series of scalloped portions joined at their ends to the upper ends of respective side bars and arched horizontally outwardly between said side bars in the plane of the rim, said scallops being in opposed registering relation to dish-receiving spaces defined between said props and extending unobstructedly into said scalloped rim portions.

3. A drainer basket as defined in claim 2, including horizontal, longitudinal reinforcing webs integral with and extending downwardly from respective longitudinal bottom bars on respective sides of said longitudinal row of dish props and integrally joined to the lower ends of the latter at respective sides thereof, a downwardly opening, unobstructed space being defined beneath said props and between said webs, to provide for nesting of the props of one basket upwardly within the props of a superimposed basket.

References Cited in the file of this patent

UNITED STATES PATENTS

| | | |
|---|---|---|
| D. 164,197 | Planeta | Aug. 7, 1951 |
| 1,714,629 | Rodin | May 28, 1929 |
| 1,902,237 | Hilpert et al. | Mar. 21, 1933 |
| 2,159,365 | Barrie | May 23, 1939 |
| 2,163,865 | Bitney | June 27, 1939 |
| 2,184,245 | Watral | Dec. 19, 1939 |
| 2,274,104 | Stanley | Feb. 24, 1942 |
| 2,299,610 | Clark | Oct. 20, 1942 |
| 2,424,475 | Madan | July 22, 1947 |